Oct. 1, 1963  D. L. ANDERSON ETAL  3,105,343
NUT HARVESTING MACHINE
Filed June 21, 1961  5 Sheets-Sheet 1

INVENTORS
DEWEY L. ANDERSON
WAYNE H. WOODS
BY
ATTORNEY

INVENTORS
DEWEY L. ANDERSON
WAYNE H. WOODS

ATTORNEY

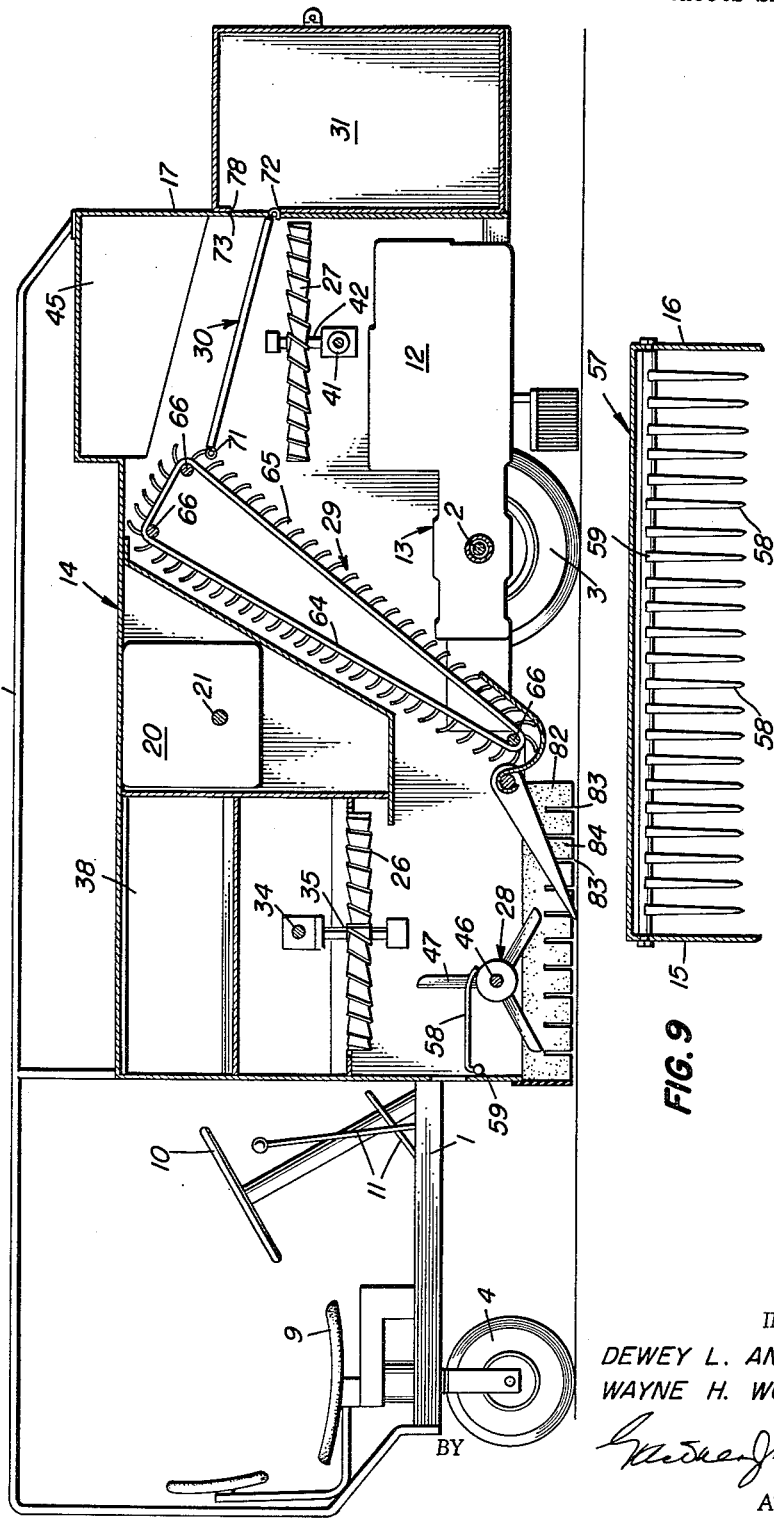

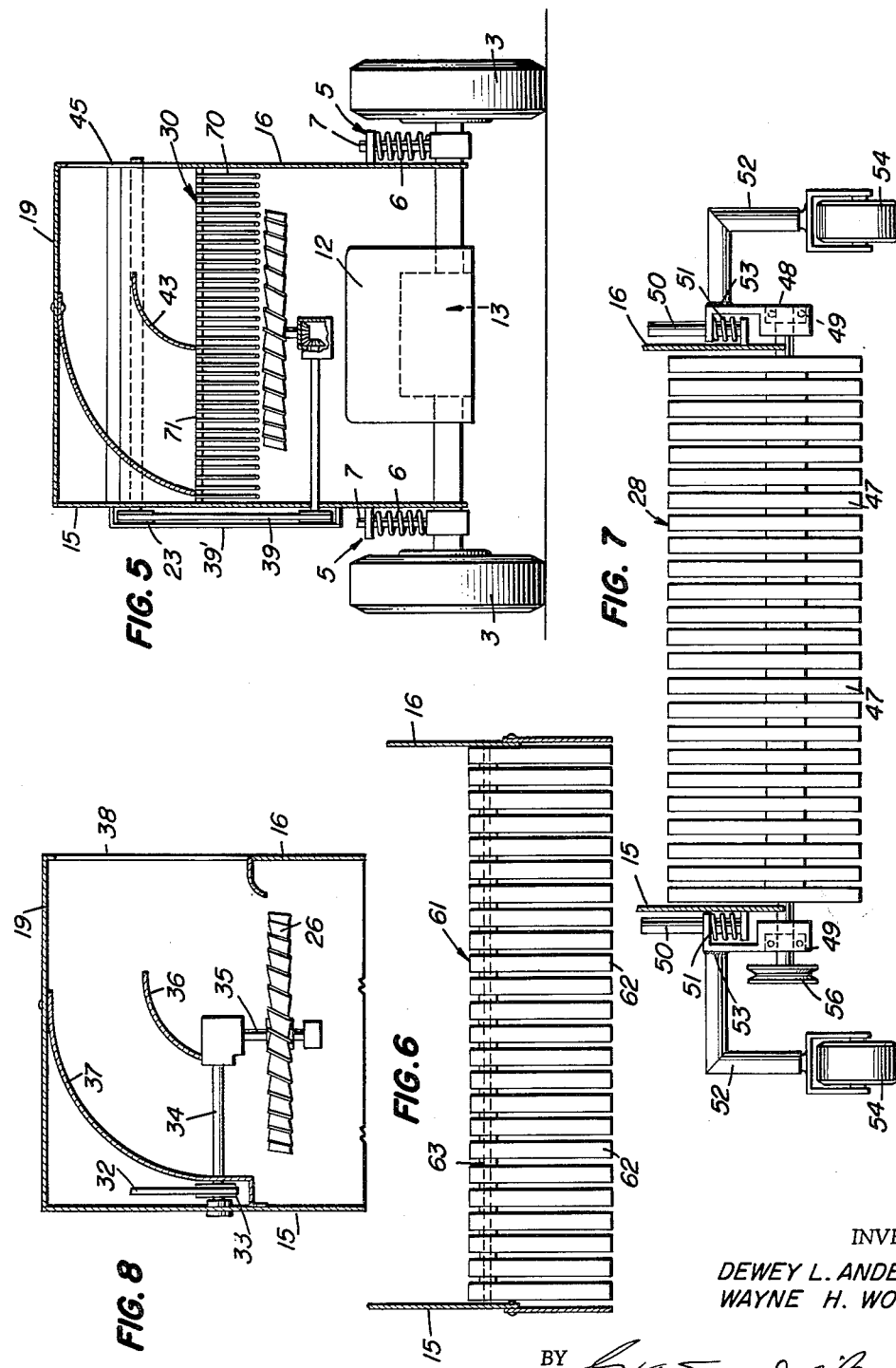

United States Patent Office 3,105,343
Patented Oct. 1, 1963

3,105,343
NUT HARVESTING MACHINE
Dewey L. Anderson, 1503 Forsyth Ave., and Wayne H. Woods, 1004 Speed St., both of Monroe, La.
Filed June 21, 1961, Ser. No. 118,672
5 Claims. (Cl. 56—328)

The present invention relates to a machine for harvesting nuts, and more particularly to an improved machine for gathering pecan nuts from the ground and separating them from twigs, leaves, pieces of grass, and other foreign materials picked up therewith.

In our application Serial No. 118,674, filed June 21, 1961, there is described and claimed an improved, self-propelled nut harvesting machine, comprising essentially a main frame having a housing supported thereon, a rotatable brush mounted on the frame forwardly thereof, adapted to remove relatively large debris from the path of the machine, suction means supported on the housing for removing relatively small debris from the ground and discharging it to one side of the machine, and a second suction means carried by the housing, adapted to remove nuts from the ground and convey them to a storage receptacle incorporated in the vehicle housing. As the machine moves forward, during the harvesting operation, the relatively heavy debris and the light debris are removed from the path of the machine and from the nuts on the ground, respectively, in sequence, and thereafterwards the nuts, together with any dust or other foreign particles adhering thereto, are removed from the ground by suction and further cleaned while being conveyed to storage.

The harvesting machine of our above identified application is designed for large scale operations, and accordingly, it is of comparatively large capacity in terms of bushels of nuts harvested per hour, or other unit of time. Additionally, by reason of its size, and weight, it is not economically feasible to transport and operate the machine in connection with harvesting operations incident to the gathering of nuts from small groves. In accordance with the present invention, we have provided an efficient, self-propelled nut harvesting machine particularly designed for gathering pecans from relatively small groves.

An object of our invention is to provide an improved, self-propelled machine for harvesting pecan nuts.

Another object of our invention is to provide an improved machine for harvesting nuts wherein means are provided for withdrawing relatively light debris from the nuts on the ground, as the machine moves along the ground, and discharging the debris through a port at one side of the machine.

Yet another object of our invention is to provide an improved, self-propelled machine for harvesting pecans having means for lifting and propelling the pecans, from which the debris has been separated, onto a conveyor whereby they are conveyed to storage.

Still another object of our invention is to provide an improved nut harvesting machine wherein suction means are provided for removing dust or other foreign material from the nuts during their passage from the conveyor to a storage bin.

A still further object of our invention is to provide an improved nut harvesting machine having deflecting means associated with each of the drive wheels of the machine, whereby the nuts are diverted from the paths of the wheels during the harvesting operation.

Yet a still further object of our invention is to provide an improved, self-propelled pecan harvesting machine, characterized by economy of operation, maneuverability, and ease of handling.

With these and other objects in view, which may be incident to our improvements, the invention consists in the parts and combinations to be hereinafter set forth and claimed, with the understanding that the several necessary elements comprising our invention, may be varied in construction, proportions and arrangements, without departing from the spirit and scope of the appended claims.

In order to make our invention more clearly understood, we have shown in the accompanying drawings means for carrying the same into practical effect, without limiting the improvements in their useful application to the particular constructions which, for the purpose of explanation, have been made the subject of illustration.

In the drawings:

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 2, showing the ramp means used to direct the pecans onto the conveyor;

FIG. 7 is a view taken along line 7—7 of FIG. 2, showing the throw-wheel arrangement for picking up nuts and propelling or projecting them onto conveying means;

FIG. 8 is a sectional view taken along line 8—8 of FIG. 3; and

FIG. 9 is a sectional view taken along line 9—9 of FIG. 2, showing the blade arrangement for removing grass and other debris from nut propelling means.

Figure 1:
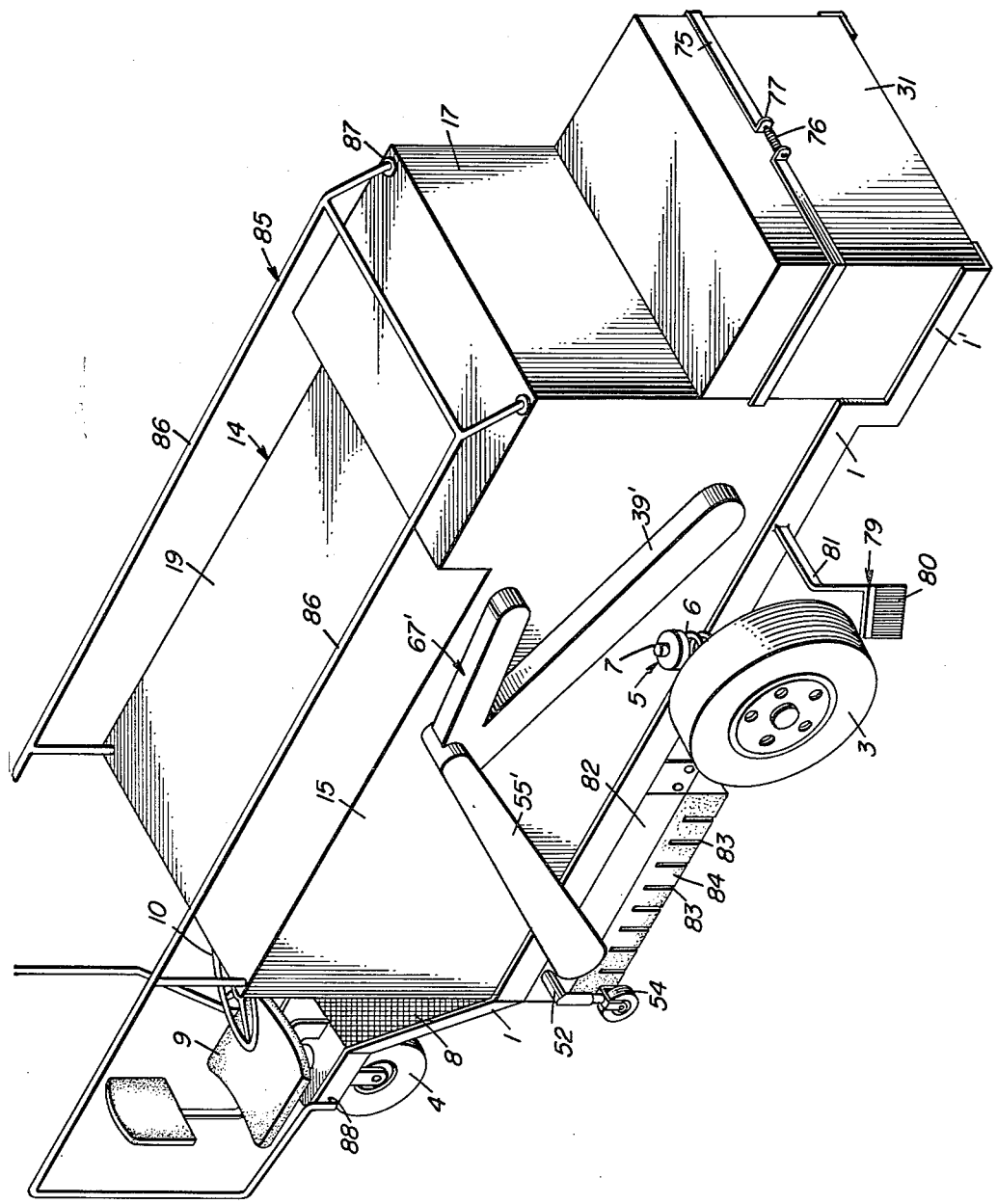
FIGURE 1 is a perspective view of our improved pecan harvesting machine.

Referring to the drawings, and more particularly to FIGS. 1–5 thereof, our improved nut harvesting machine comprises a frame 1, supported on an axle 2 having drive wheels 3 mounted thereon, together with a guide wheel 4, pivotally mounted on the frame, the frame being supported on the axle by means of suspension units 5. Each of the suspension units comprises a coil spring 6 and a shock absorber 7 concentric therewith, mounted between the frame and the axle. A floor 8 carried by the frame 1, is adapted to support a seat 9 for the operator of the machine, together with a steering wheel 10, and its associated linkage, not shown, for actuating the main propulsion system controls, designated generally by numeral 11, the propulsion system comprising an air-cooled internal combustion engine 12, a conventional transmission, drive shaft and differential, designated generally by numeral 13. A housing 14, having side walls 15 and 16, end walls 17 and 18 and a top wall 19, is rigidly secured to the main frame, and adapted to support the harvesting components therein, as will be described more fully hereinafter.

Figure 3:
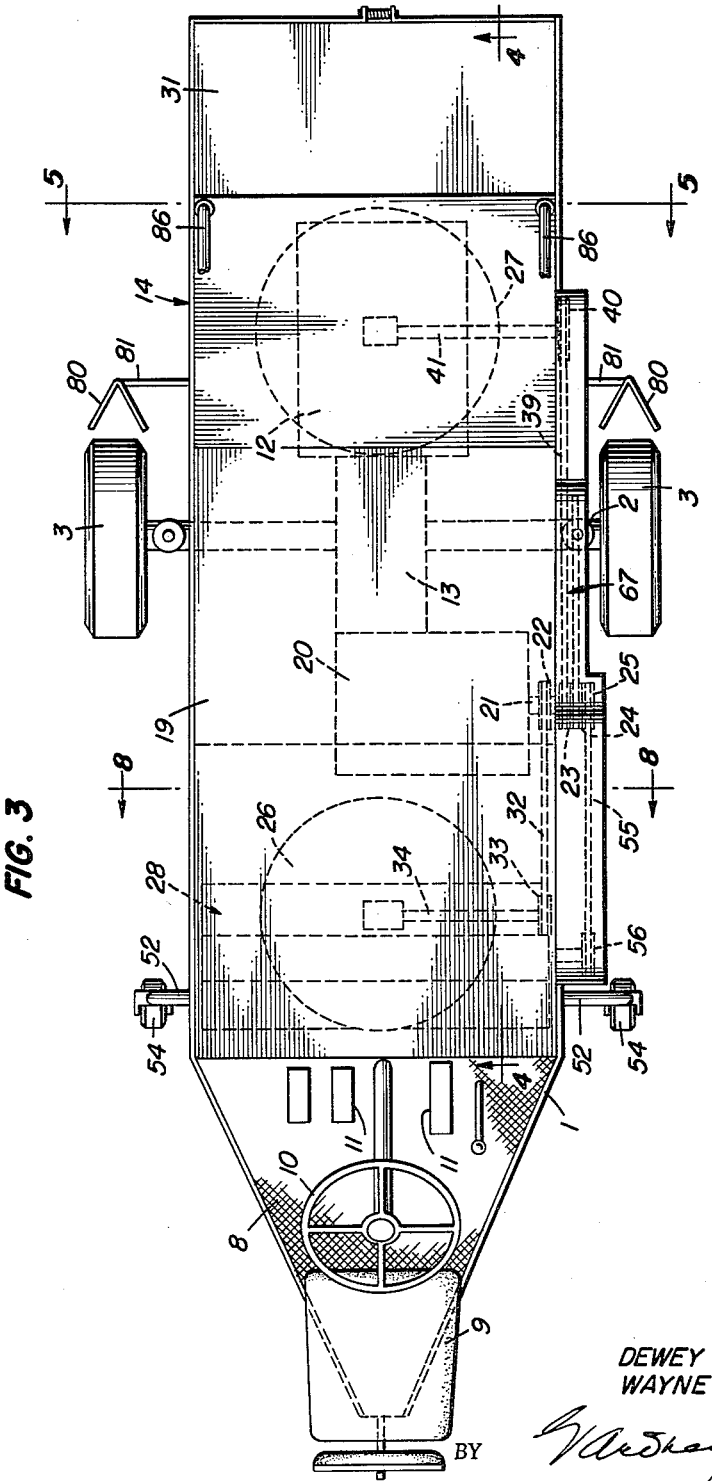
FIG. 3 is a top plan view of the machine shown in FIG. 2.

Referring to FIGS. 3 and 4, an air-cooled internal combustion engine 20, having a power take-off shaft 21, provided with pulleys 22, 23, 24 and 25 secured thereto, is mounted within the housing 14, the engine being adapted to drive the main harvesting components comprising a first suction fan 26, a second suction fan 27, and a throw-wheel 28 for lifting and propelling the nuts onto a conveyor 29, adapted to convey the nuts to a grate or screen member 30, along which they flow or slide by gravity into a suitable collection bin 31.

Figure 2:
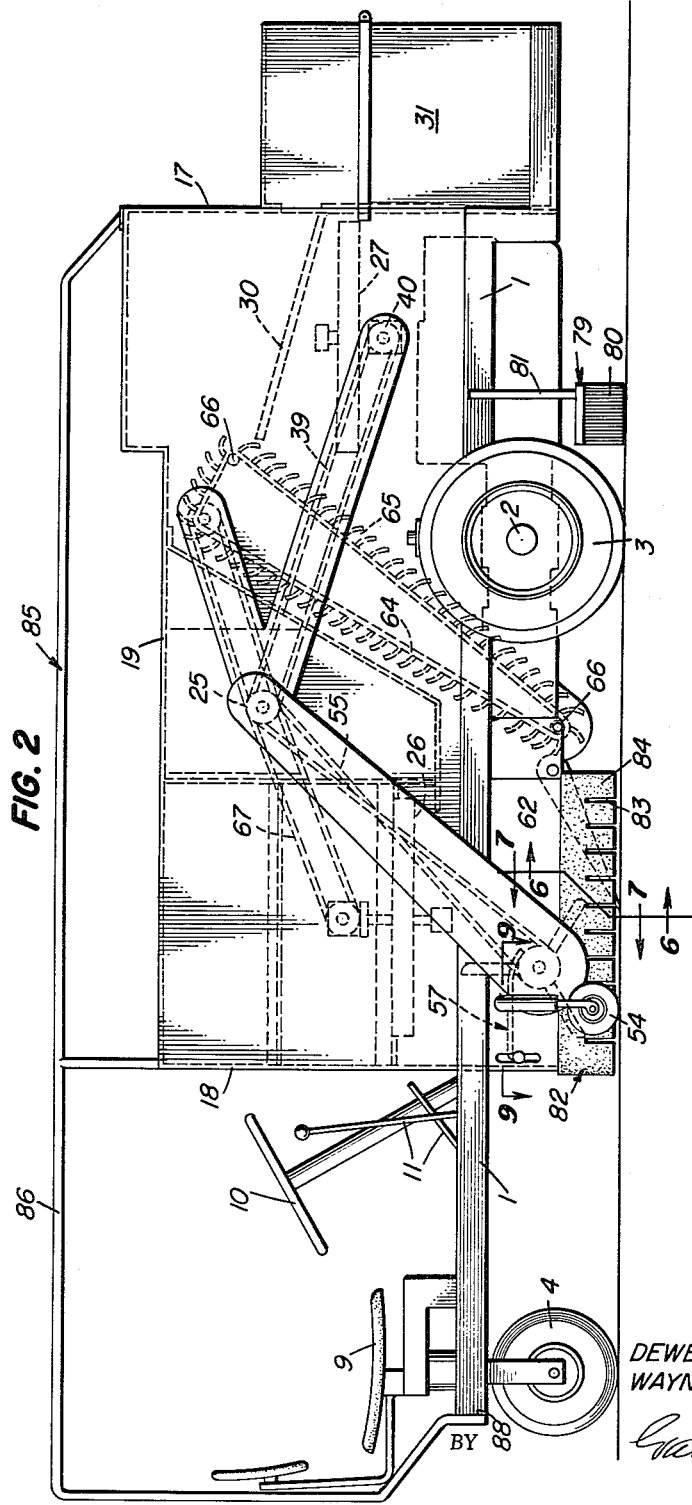
FIG. 2 is a side elevational view of the machine shown in FIG. 1.

The suction fan 26 (FIGS. 2, 3 and 8) is rotatably supported within the housing 14, and is adapted to be driven by the engine 20 through the medium of the pulley 22, a belt 32, pulley 33 and shafts 34 and 35. Curved baffle plates or deflectors 36 and 37 (FIG. 8), secured to the housing on the discharge side of the suction fan 26 are provided, in order to deflect debris, such as leaves, twigs, grass and the like, picked up by the fan, outwardly through an opening 38 formed in the side 16 of the housing. Reference being had to FIGS. 2, 3 and 5, the second suction fan 27 is rotatably mounted in the housing 14 forwardly of the vehicle, and is adapted to be driven by the engine 20 through the pulley 23, belt 39, pulley 40, and shafts 41 and 42. Curved baffle plates or deflectors 43 and 44 are secured to housing 14 on the discharge side of the fan 27 so as to deflect relatively light debris, blown upwardly by the fan, outwardly through an opening 45 formed in the side 16 of the housing.

The throw-wheel 28 (FIGS. 2, 4 and 7), comprising a shaft 46, having a plurality of axially spaced, radially extending fingers 47 secured thereto, is rotatably supported on the housing 14 by means of arms 48, the end portions of the shaft being journaled in suitable bearings 49 carried by the arms. Referring to FIG. 7, it will be noted that the arms 48 are resiliently supported on the sides of the vehicle housing by means of rods 50 supported on the sides of the housing, and by springs 51 interposed between the arms 48 and the rods, as shown. Each of the arms 48 is provided with an L-shaped member 52 having one end secured to the arm by welding, as at 53, the other end of the member 52 having a caster or wheel 54 pivotally mounted thereon. The purpose of the above described mounting of the throw-wheel is to enable the wheel to follow the contour of the ground as the machine moves thereover, during the nut harvesting operation. Rotation of the throw-wheel is effected by means of the engine 20 through the medium of pulley 25, (FIG. 3), belt 55, and pulley 56. It will be understood that the belt 55 will be of suitable material, for example, a coil spring, so that it will remain taut even though the driven pulley 56 rises or falls with respect to the driving pulley 25.

A rake-like member, designated generally by the numeral 57, (FIGS. 2, 4 and 9) comprising a plurality of axially spaced blades 58 rigidly secured to a rod 59, is mounted within the housing so that the blades fit between adjacent throw-wheel fingers 47, the rod 59 being slidably mounted in slots 60 formed in the housing sides 15 and 16. The purpose of the rake arrangement is to remove grass or other debris which may adhere to the throw-wheel 46 or to the blades 47 thereof, and by supporting the rod 59 in the slots 60 of the housing, the rake member 57 is enabled to follow the rise and fall of the throw-wheel during the harvesting operation.

In order to direct the pecans picked up by the throw-wheel onto the conveyor 29, ramp means 61 is provided. Referring to FIGS. 2, 4 and 6, the ramp means comprises a plurality of axially spaced, wedge-shaped members 62, pivotally connected to a transversely extending rod 63 secured to the sides of the vehicle housing. It will be noted that the ramp is positioned forwardly of the throw-wheel and, accordingly, the pecans which fall onto the ramp will be propelled or pushed upwardly thereof onto the conveyor.

The conveyor 29, (FIG. 4) comprising an endless belt 64 having a plurality of bucket members 65 secured thereto, is mounted in the housing 14 adjacent the upper end of the ramp 61 by means of transversely extending rollers 66 journaled in the sides of the housing. The conveyor is adapted to be driven by the engine 20 through the pulley 24, a belt 67 and a pulley 68. A transversely extending trough 69 is mounted in the housing adjacent the lower end of the conveyor 29 to provide a supply of pecan nuts to be picked up by the buckets 65 of the conveyor.

The inclined grate 30 mounted within the housing adjacent the discharge end of the conveyor 29, (FIGS. 2 and 4) is similar to the grate arrangement disclosed in our copending application Serial No. 118,674, filed June 21, 1961, and comprises a plurality of axially spaced, rubber-covered rods 70, (FIG. 5) each of the rods having one end secured to a transversely extending bar 71 adjacent the discharge end of the conveyor, and having its opposite end secured to a transversely extending bar 72, supported on the end wall 17 of the housing 14, adjacent an opening 73 formed in the said wall. A suitable catch-box or bin 31, for collection and storage of pecans, is removably supported on an extension 1' of the vehicle frame 1, adjacent the end wall 17 by means of straps or bands 75, one end of each of the bands being secured to the end wall, the free ends of the bands being adapted to be drawn together by means of a screw 76, threadable into a terminal position 77 of one of the bands. The bin 31 is formed with an opening 78, in register with the opening 73 of the end wall 17, so that the pecans deposited on the grate 30 by the conveyor 29 may slide downwardly on the grate into the collection bin.

As will be seen in FIGS. 1 and 2, guard means 79 are provided, for diverting pecans from the paths of the drive wheels 3 of the machine. Each of the guard members comprises a V-shaped brush 80, having a hanger 81 supported on the vehicle frame forwardly of the drive wheels. Instead of using brushes of the above described type, spherical wedge-shaped sectors formed of rubber or other resilient material may be supported forwardly of the drive wheels in such fashion that the edge of the dihedral angle formed by the faces of the sector, faces the direction of forward movement of the harvester, so as to deflect pecans from the paths of the wheels. It is also contemplated that the brush hangers will be supported in such manner that they may be elevated with respect to their points of support, during transport of the machine.

Further reference being had to FIGS. 1 and 2, it will be noted that the throw-wheel 28 and the ramp 62 are enclosed by means of skirt members 82, one of which members is shown, supported on the frame 1, at opposite sides of the vehicle. The skirt members are preferably formed from rubber, and are provided with a plurality of parallel slits 83, defining a series of flexible fingers 84, whereby to enable the lower portion of the skirts to bend or flex without damage, when small obstructions are encountered during operation of the harvester. The function of the skirt members is to restrain the pecans, within the passage defined by the skirts, from moving outwardly of the sides of the machine during the harvesting operation.

With reference to the construction and arrangement of the belts and associated pulleys used to drive the suction fans, throw-wheel, and the endless conveyor, it will be observed (FIG. 3), that only the belt 32 and its associated pulleys 22 and 33 lie within the confines of the housing 14, and that the remaining belts and pulleys are located in different planes outside of the housing. Accordingly, in order to protect the drive means positioned externally of the main housing, these drive means are enclosed by shields 39', 55' and 67' (FIG. 1), detachably secured to the side 15 of the housing.

In order to protect the operator from injury by relatively low overhanging tree limbs during the harvesting operation, suitable guard means 85 are provided. As shown in FIG. 1, the guard means comprises a pair of parallel, rubber-covered rods 86, secured as at 87 to the top of the housing, and extending upwardly and rearwardly thereof to a position slightly beyond the seat 9, the vertical leg 88 of each rod being secured at 89 to the adjacent side frame of the vehicle.

In the operation of the nut harvester, as the machine moves over the ground, the nuts lying in the paths of the drive wheels 3 are deflected outwardly and inwardly of the wheels by the brushes 80 so as not to be crushed, and as the machine continues to advance, the ramp member 62 moves over the nuts and intermingled debris confined between the skirt members 82. At this stage of the operation the debris is under the influence of the suction fan 26, and is drawn upwardly and discharged through opening 38 in the side 16 of the housing, and the nuts are propelled or projected in the direction of the conveyor 29 by the throw-wheel 28. It will be understood that by reason of the rapid rotation of the throw-wheel, substantially all of the nuts are projected or thrown directly onto the conveyor, and those which do not reach the conveyor, or are deflected therefrom, fall onto the ramp 62 to be subsequently picked up and again thrown in the direction of the carriage by the throw-wheel. The nuts deposited on the conveyor are discharged therefrom onto the grate 30, and as they slide downwardly thereof, under the influence of gravity, into the catch box or collection bin 31, any dust or other residue adhering to the nuts is removed by the suction fan 27 and discharged to atmosphere through the opening 45 in the side of the housing.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

We claim:

1. A self-propelled nut harvesting machine comprising a frame resiliently supported on the unsprung portion of the vehicle, a housing supported on said frame, a first suction means rotatably supported on the housing for removing relatively small debris from the ground and discharging it to one side of the machine, ramp means pivotally supported in the housing below said first suction means, a throw-wheel, adapted to remove nuts from the ground and propel them onto said ramp means, a conveyor mounted in the housing adjacent the ramp means adapted to convey the harvested nuts to storage, a storage bin carried by the machine, a second suction means interposed between the discharge side of the conveyor and the storage bin adapted to remove dust and other foreign material from the nuts during their passage from the conveyor to the storage bin, and means supported on the housing adapted to actuate said first and second suction means, the throw-wheel, and the conveyor.

2. A self-propelled nut harvesting machine in accordance with claim 1, wherein the ramp means comprises a plurality of axially spaced, wedge-shaped members pivotally supported on a rod secured to the sides of the vehicle housing.

3. A self-propelled nut harvesting machine in accordance with claim 1, wherein a downwardly inclined grate is interposed between the discharge end of the conveyor and the storage bin, whereby the harvested nuts deposited on the grate by the conveyor slide along the grate, under the influence of gravity, into the storage bin.

4. A self-propelled nut harvesting machine, in accordance with claim 3, wherein the grate member comprises a plurality of rubber-covered rods supported on the vehicle housing adjacent the second suction means.

5. A self-propelled nut harvesting machine in accordance with claim 1, wherein the throw-wheel comprises a shaft having a plurality of axially spaced, radially extending blades secured thereto, brackets resiliently mounted on the housing, said shaft being journalled in the brackets, casters connected to the brackets, whereby the throw-wheel may follow the contour of the ground over which the machine moves during the harvesting operation, and a rake-like member pivotally supported on the vehicle housing, the free end portions of the fingers of the rake-like member being seated between the successive adjacent blades of the throw-wheel, whereby debris may be removed from the throw-wheel shaft and the blades.

References Cited in the file of this patent

UNITED STATES PATENTS

| | | |
|---|---|---|
| 1,565,162 | King | Dec. 8, 1925 |
| 2,441,244 | Kimball | May 11, 1948 |
| 2,780,904 | Bowie et al. | Feb. 12, 1957 |
| 2,870,594 | Larsh | Jan. 27, 1959 |
| 2,880,564 | Degenhardt | Apr. 7, 1959 |